(12) United States Patent
Qiao et al.

(10) Patent No.: US 11,650,368 B1
(45) Date of Patent: May 16, 2023

(54) ELECTRONIC DEVICE WITH AN OPTICAL COUPLING LAYER AND DIFFRACTIVE LAYER

(71) Applicant: Apple Inc., Cupertino, CA (US)

(72) Inventors: Yi Qiao, San Jose, CA (US); David A. Doyle, Cupertino, CA (US); James P. Landry, Campbell, CA (US); Jean-Pierre S. Guillou, Los Gatos, CA (US); Ming Xu, Cupertino, CA (US); Paul C. Kelley, San Francisco, CA (US); Shawn R. Gettemy, San Martin, CA (US); Tyler R. Kakuda, San Francisco, CA (US); Ying-Chih Wang, Sunnyvale, CA (US); Yue Cui, Campbell, CA (US)

(73) Assignee: Apple Inc., Cupertino, CA (US)

( * ) Notice: Subject to any disclaimer, the term of this patent is extended or adjusted under 35 U.S.C. 154(b) by 295 days.

(21) Appl. No.: 17/071,213

(22) Filed: Oct. 15, 2020

Related U.S. Application Data

(60) Provisional application No. 62/944,190, filed on Dec. 5, 2019.

(51) Int. Cl.
*G02B 6/06* (2006.01)
*G02B 6/34* (2006.01)
*G02B 1/14* (2015.01)

(52) U.S. Cl.
CPC ............... *G02B 6/06* (2013.01); *G02B 1/14* (2015.01); *G02B 6/34* (2013.01)

(58) Field of Classification Search
CPC ............... G02B 1/14; G02B 6/06; G02B 6/34
See application file for complete search history.

(56) References Cited

U.S. PATENT DOCUMENTS

| | | | |
|---|---|---|---|
| 8,724,942 B2 | 5/2014 | Logunov et al. | |
| 8,976,324 B2* | 3/2015 | Yang | G02F 1/133524 349/158 |
| 10,209,412 B2* | 2/2019 | Chan | G02B 27/0172 |
| 10,788,908 B2* | 9/2020 | Jung | H04M 1/0283 |

(Continued)

FOREIGN PATENT DOCUMENTS

WO 2019202554 A1 10/2019

*Primary Examiner* — Daniel Petkovsek
(74) *Attorney, Agent, or Firm* — Treyz Law Group, P.C.; Joseph F. Guihan

(57) ABSTRACT

An electronic device may have a display that displays an image. The image may be viewed through a display cover layer that overlaps the display. The display cover layer may include an optical coupling layer such as a coherent fiber bundle. A pixel expansion layer such as a diffractive layer may be incorporated between the optical coupling layer and a protective layer. The diffractive layer may create duplicate pixels to occupy otherwise non-light-emitting areas on the output surface of the display cover layer. The diffractive layer may also create duplicate pixels that overlap adjacent pixels to allow for brightness averaging. An adhesive layer or the protective layer may be used to form diffractive elements for the diffractive layer. An adhesive layer having a high index of refraction may be interposed between the optical coupling layer and the display panel to mitigate undesired reflections of ambient light.

20 Claims, 13 Drawing Sheets

(56) References Cited

U.S. PATENT DOCUMENTS

| | | | |
|---|---|---|---|
| 2008/0144174 A1* | 6/2008 | Lucente | H04N 13/307 |
| | | | 348/E13.028 |
| 2015/0241705 A1 | 8/2015 | Abovitz et al. | |
| 2019/0041658 A1 | 2/2019 | Gollier et al. | |
| 2019/0094541 A1 | 3/2019 | Choi et al. | |

* cited by examiner

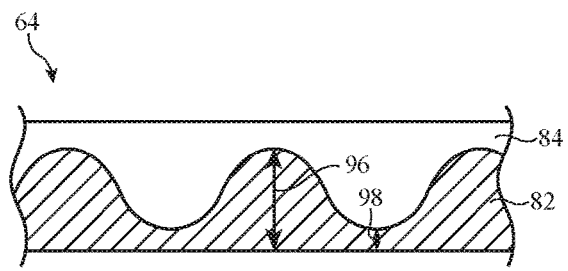
FIG. 9A
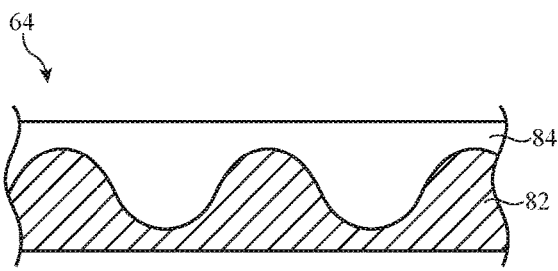
FIG. 9B
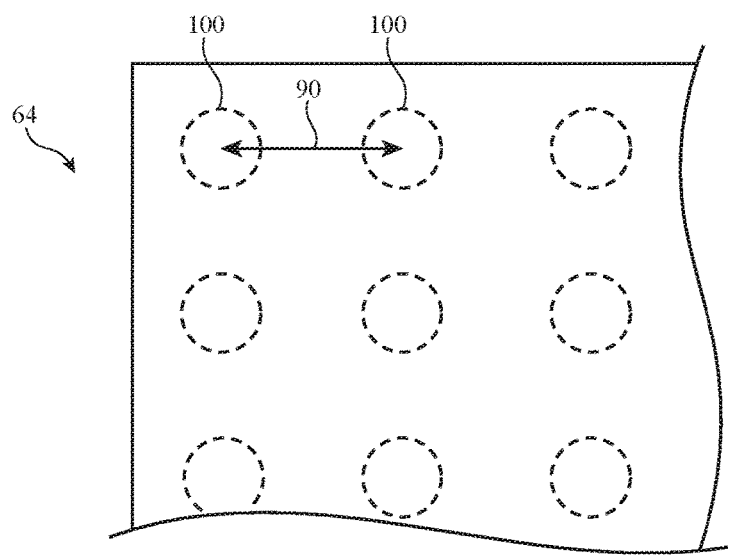
FIG. 9C
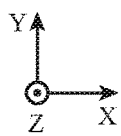

ELECTRONIC DEVICE WITH AN OPTICAL COUPLING LAYER AND DIFFRACTIVE LAYER

This application claims the benefit of provisional patent application No. 62/944,190, filed Dec. 5, 2019, which is hereby incorporated by reference herein in its entirety.

FIELD

This relates generally to electronic devices, and, more particularly, to electronic devices with displays.

BACKGROUND

Electronic devices may have displays. Displays have arrays of pixels for displaying images for a user. The shape and other characteristics of many displays can pose challenges during integration into an electronic device, particularly in situations where space is limited.

SUMMARY

An electronic device may have a display that displays an image. The image may be viewed through a display cover layer that overlaps the display.

The display cover layer may include an optical coupling layer such as a coherent fiber bundle or layer of Anderson localization material. The optical coupling layer may have an input surface that receives an image from the display and a corresponding output surface to which the image is transported. The display cover layer may also include a protective layer such as a layer of glass or other material. The protective layer may protect underlying structures such as polymer fibers or other structures in the optical coupling layer.

To mitigate visible artifacts such as a screen-door effect or sparkle effect, a pixel expansion layer may be incorporated into the display cover layer. The pixel expansion layer may be interposed between the optical coupling layer and the protective layer. The pixel expansion layer may be a diffractive layer that creates duplicate pixels to occupy otherwise non-light-emitting areas on the output surface of the display cover layer (mitigating the screen-door effect). The diffractive layer may also create duplicate pixels that overlap adjacent pixels to allow for brightness averaging which mitigates the sparkle effect.

The diffractive layer may be formed from different layers that have different refractive indices and that form diffractive elements. An adhesive layer or the protective layer may be used to form the diffractive elements. A property of the diffractive layer may vary across the diffractive layer.

An adhesive layer having a high index of refraction may be interposed between the optical coupling layer and the display panel to mitigate undesired reflections of ambient light. A diffractive lens may also be interposed between the optical coupling layer and the display panel.

BRIEF DESCRIPTION OF THE DRAWINGS

FIGS. 9A and 9B are cross-sectional side views of an illustrative diffractive layer that includes layers having different refractive indices and gradually varying thicknesses in accordance with an embodiment.

FIG. 9C is a top view of the illustrative diffractive layer of FIGS. 9A and 9B in accordance with an embodiment.

DETAILED DESCRIPTION

An electronic device may have a display. The display may have an array of pixels for creating an image. The image may pass through a display cover layer that overlaps the array of pixels. To minimize display borders or to otherwise create a desired appearance for the display, the display cover layer may include an optical coupling layer. The optical coupling layer may have an input surface that receives an image from the array of pixels and a corresponding output surface to which the image is transported from the input surface. A user viewing the optical coupling layer will view the image from the array of pixels as being located on the output surface.

In configurations in which the input and output surfaces have different shapes, the optical coupling layer may be used to warp the image produced by the array of pixels. For example, the shape of the image can transformed and the effective size of the image can be changed as the image passes through the optical coupling layer. In some configurations, edge portions of the image are stretched outwardly to help minimize display borders.

Optical coupling layers can be formed from coherent fiber bundles (sometimes referred to as fiber optic plates) and/or Anderson localization material. Glass and/or polymer may be used in forming optical coupling layer structures. To help protect the output surface of an optical coupling layer, an optional transparent protective layer may be included on the outer surface of the display cover layer. This transparent protective layer may be, for example, a glass plate, or a protective layer formed from other transparent material such as clear polymer or sapphire or other crystalline materials. In some arrangements, optical coupling layers and/or protective layers can be formed over components other than displays.

In an arrangement where a fiber optic plate is used to expand the size of an image and minimize display borders, the effective display resolution at the edge of the display (where fibers are expanded to minimize display borders) may be reduced. This may cause a screen-door effect due to a perceptible gap between the light-emitting area of each pixel. A diffractive layer may be incorporated into the electronic device to mitigate the screen-door effect. The diffractive layer may also be used to mitigate additional visible artifacts in the display such as a sparkle effect.

Figure 1:
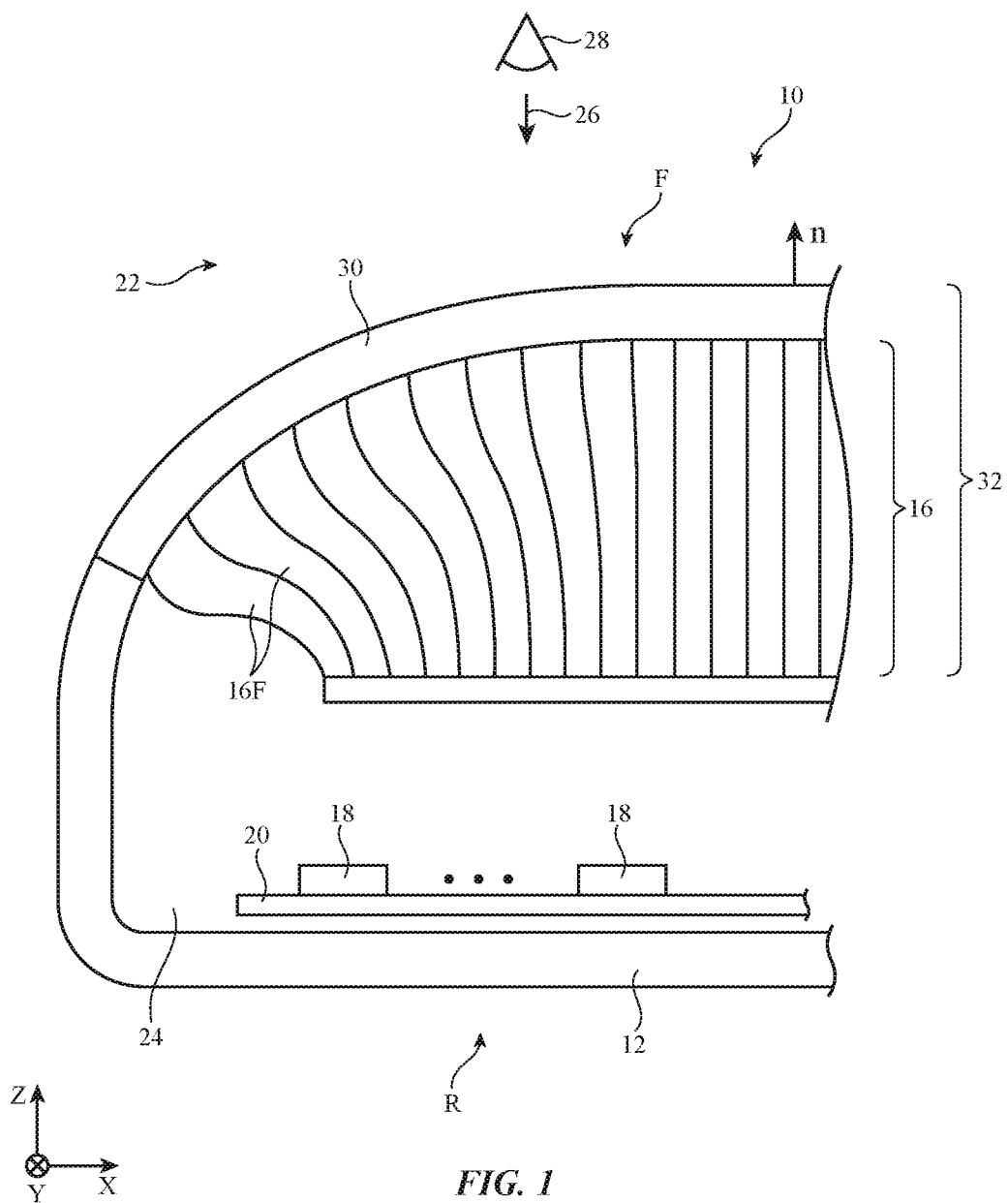
FIG. 1 is a side view of an illustrative electronic device with an optical coupling layer in accordance with an embodiment.

A cross-sectional side view of a portion of an illustrative electronic device with a display cover layer that includes an optical coupling layer is shown in FIG. 1. In the example of FIG. 1, device 10 is a portable device such as a cellular telephone, wristwatch, or tablet computer. In general, any type of electronic device may have an optical coupling layer such as a desktop computer, a voice-control speaker, a television or other non-portable display, a head-mounted device, an embedded system such as a system built into a vehicle or home, an electronic device accessory, and/or other electronic equipment.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22. In some configurations, an opening may be formed in housing 12 for a data port, a power port, to accommodate audio components, or to accommodate other devices. Clear housing regions may be used to form optical component windows. Dielectric housing structures may be used to form radio-transparent areas for antennas and wireless power components.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, optical touch sensors, optical proximity sensors, and/or other touch sensors and/or proximity sensors, monochromatic and color ambient light sensors, image sensors, fingerprint sensors, ultrasonic sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays such as display 14. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may have a polymer substrate that is sufficiently flexible to be bent. Display 14 may have a rectangular pixel array or a pixel array of another shape for displaying images for a user and may therefore sometimes be referred to as a pixel array. Display 14 may also sometimes be referred to as a display panel, display layer, or pixel layer. Each pixel array in device 10 may be mounted under a transparent housing structure (sometimes referred to as a transparent display cover layer).

In the example of FIG. 1, display (pixel array) 14 is mounted under display cover layer 32. Display cover layer 32 (which may be considered to form a portion of the housing of device 10), covers front face F of device 10. Configurations in which opposing rear face R of device 10 and/or sidewall portions of device 10 have transparent structures covering displays and other optical components may also be used.

As shown in FIG. 1, display cover layer 32 may include optical coupling layer 16 and protective layer 30. Protective layer 30 may be formed from a layer of glass, clear polymer, crystalline material such as sapphire or other crystalline material, and/or other transparent material. The presence of layer 30 may help protect the outer surface of layer 16 from scratches. If desired, layer 30 may be omitted (e.g., in configurations in which a thin-film protective coating is present on the outer surface of layer 16, in configurations in which layer 16 is formed from hard material such as glass, and/or in other configurations in which layer 16 is resistant to scratching). A layer of adhesive and/or other structures may be formed between protective layer 30 and optical coupling layer 16 and/or may be included elsewhere in the stack of layers on display 14.

During operation, the pixels of display 14 produce image light that passes through optical coupling layer 16. In configurations in which optical coupling layer 16 is formed from a coherent fiber bundle, optical coupling layer 16 has optical fibers 16F. The fibers or other optical structures of optical coupling layer structures such as optical coupling layer 16 transport light (e.g., image light and/or other light) from one surface (e.g., an input surface of layer 16 that faces display 14) to another (e.g., an output surface of layer 16 that faces viewer 28, who is viewing device 10 in direction 26). As the image presented to the input surface of layer 16 is transported to the output surface of layer 16, the integrity of the image light is preserved. This allows an image produced by an array of pixels to be transferred from an input surface of a first shape at a first location to an output surface with a different shape (e.g., a shape with a footprint that differs from that of the input surface, a shape with a curved cross-sectional profile, a shape with a region of compound curvature, and/or a shape with other desired features).

Optical coupling layer 16 (sometimes referred to as image transport layer 16) may therefore move the location of an image and may optionally change the shape of the surface on which the image is presented. In effect, viewer 28 will view the image from display 14 as if the image were generated on the output surface of optical coupling layer 16. In arrangements in which the image from display 14 is warped (geometrically distorted) by optical coupling layer 16, digital pre-distortion techniques or other compensation techniques may be used to ensure that the final image viewed on the output surface of optical coupling layer 16 has a desired appearance. For example, the image on display 14 may be prewarped so that this prewarped image is warped by an equal and opposite amount upon passing through layer 16. In this way, the prewarped image is effectively unwarped by passage through layer 16 and will not appear distorted on the output surface.

In configurations of the type shown in FIG. 1, device 10 may have four peripheral edges and a rectangular footprint when viewed in direction 26 or may have other suitable shapes. To help minimize the size of inactive display borders as a user is viewing front face F of device 10 as shown in FIG. 1, the shapes of fibers 16F along the periphery of layer 16 may be deformed outwardly as shown in FIG. 1. These fibers 16F each have an outwardly bent segment that bends away from surface normal n of the center of layer 30 (e.g., away from an axis parallel to the Z axis of FIG. 1) and each have an inwardly bent segment that bends back towards surface normal n to help direct output light towards viewer 28.

The deformed shapes of fibers 16F (and/or the corresponding deformations made to optical filaments in Anderson localization material in layer 16) may help distribute image light laterally outwards in the X-Y plane so that the effective size of display 14 is enlarged and the image produced by display 14 covers some or all of the sidewalls of housing 12 or other peripheral portions of device 10 when the image on front face F is being viewed by viewer 28. For example, the bent shapes of fibers 16F of FIG. 1 may help shift portion of the displayed image laterally outward in the X-Y plane along the edges and corners of device 10 to block the edges of device 10 from view. In some arrangements, the portions of fibers 16F at the outermost surface of layer 16 are oriented parallel or nearly parallel with viewing direction 26 and the Z axis of FIG. 1, which helps ensure that some or all of the light that has passed through layer 16 will travel in the Z direction and be viewable by viewer 28.

Figure 2:
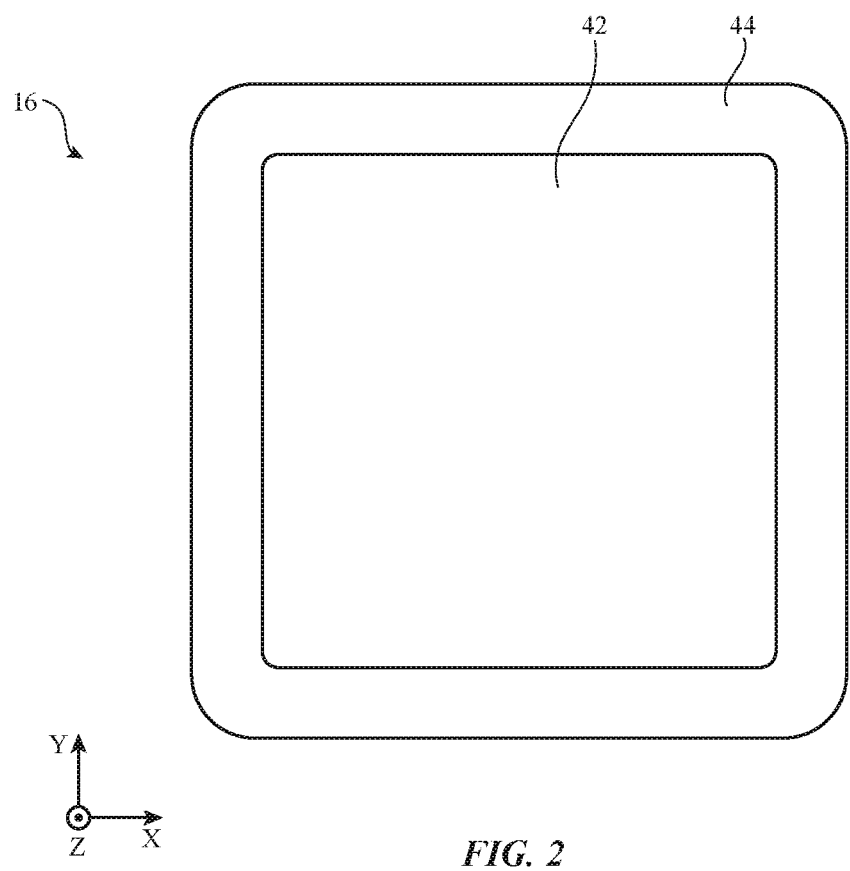
FIG. 2 is a top view of an illustrative optical coupling layer in accordance with an embodiment.

A top view of an optical coupling layer is shown in FIG. 2. As shown, the optical coupling layer may have a central portion 42. Central portion 42 may have fibers that are not bent and may sometimes be referred to as an unformed portion or unbent portion of the optical coupling layer. The unformed portion of the optical coupling layer may be surrounded by a peripheral portion 44 of the optical coupling layer in which the fibers are bent (sometimes referred to as a formed portion or bent portion). As shown in the top view of FIG. 2, portion 44 may extend in a ring around portion 42 (e.g., portion 44 may laterally surround portion 42). Portion 44 may have fibers that are bent in order to hide an inactive border area of the display.

As shown in FIG. 2, the optical coupling layer may have a rectangular footprint with rounded corners when viewed from above. The rounded corners may be bent downwards (e.g., in the negative Z-direction away from the viewer and towards the display panel). The output surface of the optical coupling layer may have compound curvature in the rounded corner regions.

Figure 3:
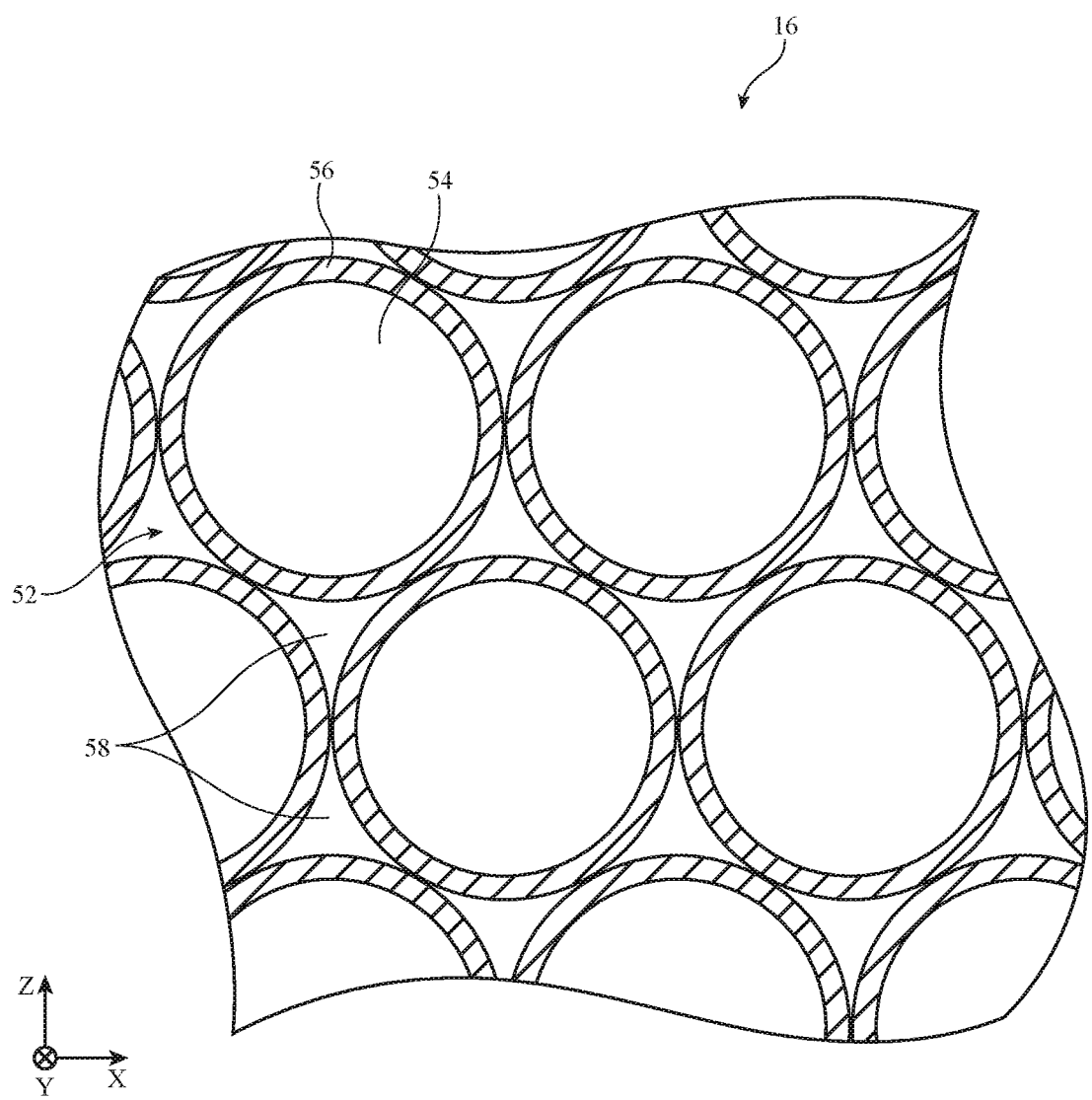
FIG. 3 is a cross-sectional view of a portion of an illustrative optical coupling layer formed using a coherent fiber bundle in accordance with an embodiment.

Optical coupling layer 16 may be formed from fibers. Fibers used to form optical coupling layer 16 may have any suitable configuration. A cross-sectional view of fiber optic plate 16 in an illustrative arrangement in which fibers 52 have multiple layers of material is shown in FIG. 3. As shown in FIG. 3, fibers 52 may each have a core such as core 54. Cores 54 and the other structures of optical coupling layer 16 may be formed from transparent materials such as polymer, glass, crystalline material such as sapphire, and/or other transparent materials. In an illustrative configuration, which may sometimes be described herein as an example, optical coupling layer 16 includes polymer fibers.

Fiber cores 54 may be formed from polymer of a first refractive index and may be surrounded by cladding 56 (e.g., polymer) of a second, lower refractive index. The difference in refractive index between cores 54 and cladding 56 may be greater than 0.1, greater than 0.2, greater than 0.3, between 0.2 and 0.4, etc. This arrangement allows fibers 52 to guide light in accordance with the principal of total internal reflection. Binder material 58 may hold fibers 52 together to form optical coupling layer 16 (fiber optic plate 16). The fractional cross-sectional area occupied by core 54 may be between 65% and 85%, between 60% and 75%, greater than 60%, greater than 65%, greater than 70%, or another desired value. The fractional cross-sectional area occupied by cladding 56 may be between 2% and 10%, between 1% and 20%, greater than 5%, less than 20%, less than 15%, less than 10%, or another desired value. The fractional cross-sectional area occupied by binder material 58 may be between 2% and 10%, between 1% and 20%, greater than 5%, less than 20%, less than 15%, less than 10%, or another desired value.

The diameter of core 54 may be 5-15 microns or other suitable size (e.g., at least 3 microns, at least 7 microns, 10 microns, at least 15 microns, less than 20 microns, less than 14 microns, etc.). The thickness of cladding 56 may be 0.5 microns, at least 0.1 microns, at least 0.4 microns, less than 2 microns, less than 0.9 microns, or other suitable thickness. If desired, fibers 52 may contain more layers, fewer layers, layers arranged in different orders, and/or may have other configurations. Light absorbing material may be incorporated into optical coupling layer 16 to absorb light and prevent transmission of undesired types of light. Light absorbing material may be incorporated into some or all of the cores, cladding, and/or binder within the optical coupling layer. The light absorbing material may be, for example, polymer, glass, or other material into which light-absorbing material such as dye and/or pigment has been incorporated.

The optical coupling layer may have an output surface with a larger surface area than the input surface, thus allowing the optical coupling layer to hide an inactive border area of the display. To achieve this expansion of the optical coupling layer, some of the fibers (e.g., in peripheral portion 44 of the optical coupling layer) may have a larger diameter at the output surface of the optical coupling layer than at the input surface of the optical coupling layer. A consequence of this optical coupling layer expansion is that the effective display resolution is reduced. This may cause a perceived screen-door effect when viewing the display of electronic device 10.

The screen-door effect may refer to a visible artifact of a display that is caused by lines separating pixels in the display being visible. Each pixel in a display has a respective light-emitting area. Between the pixels, non-light-emitting areas are present. If the display resolution is sufficiently high, the non-light-emitting areas are not perceptible to the viewer of the display. However, as the resolution decreases, the non-light-emitting areas may become perceptible to the viewer. The non-light-emitting areas appear as dark (black) lines extending between the pixels in a grid or screen-door like pattern.

In electronic device 10, the pixels on display panel 14 may have a sufficiently high resolution to prevent a perceptible screen-door effect. In other words, in the absence of display cover layer 32 with optical coupling layer 16, the screen-door effect may not be present. However, the expansion of the optical coupling layer effectively reduces the display resolution on the output surface of the optical coupling layer. In one illustrative example, display panel 14 may have a pixel density of 500 pixels per inch (PPI). The pixel density may be similar in the central portion of the output surface of the optical coupling layer. However, at the peripheral portion of the output surface of the optical coupling layer, where the fibers are expanded, the pixel density may be reduced to about 250 PPI. At this reduced resolution, the screen-door effect may be present when viewing the output surface of the optical coupling layer.

Figure 4:
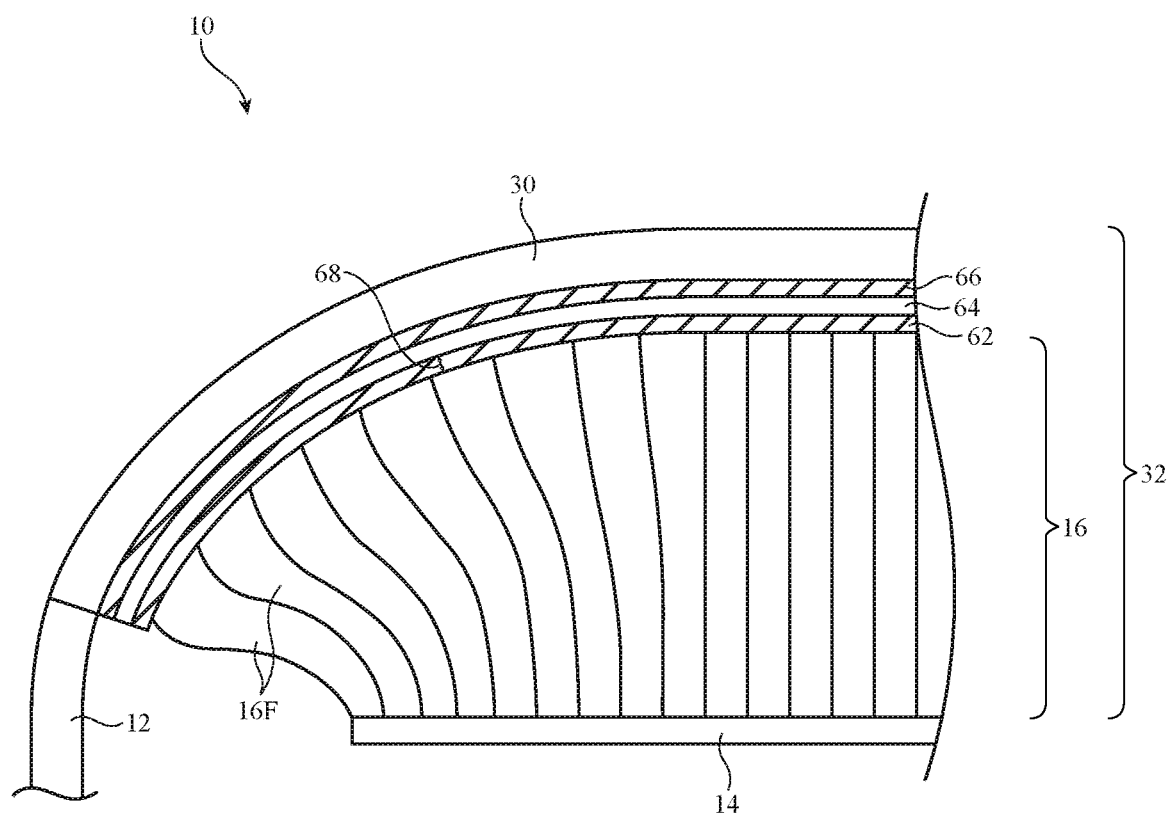
FIG. 4 is a side view of an illustrative electronic device with an optical coupling layer and a diffractive layer in accordance with an embodiment.

To mitigate the screen-door effect, the electronic device may include a light spreading layer as shown in FIG. 4. Light spreading layer 64 may spread the light from a pixel to cover the non-light-emitting areas adjacent to that pixel. Covering the non-light-emitting areas with light from the pixels reduces the screen-door effect. Because the light spreading layer effectively expands the light-emitting area of a given pixel, the light spreading layer may instead be referred to as pixel expansion layer 64, pixel widening layer 64, etc.

The pixel expansion layer may be a diffractive layer (e.g., diffraction layer 64, diffractive layer 64, etc.) that uses diffraction of light to create duplicate light-emitting areas (e.g., duplicate pixels) that are shifted relative to the actual light-emitting areas (e.g., actual pixels or original pixels). The duplicate pixel areas may be shifted to occupy the otherwise non-light-emitting areas to reduce the screen-door effect. The diffractive layer may have diffractive structures that create the duplicate pixels using diffraction. This example is merely illustrative, and other types of pixel expansion layers may be used if desired. For example, the pixel expansion layer may be a diffusion layer that evenly spreads the light from the light-spreading area, a refractive layer with prisms or other structures to direct the light in a desired manner, etc. In one example, the output surfaces of each fiber 16F in the optical coupling layer may be shaped or angled to direct the output light in a way that mitigates the screen-door effect. In yet another example, the diffractive layer may be formed from metamaterial structures (e.g., a material with nano-scale structures in a periodic pattern).

As shown in FIG. 4, adhesive layers such as adhesive layers 62 and 66 may be used to secure the pixel expansion layer within the display cover layer. In the example of FIG. 4, a first adhesive layer 66 is interposed between transparent protective structure 30 and pixel expansion layer 64. A second adhesive layer 62 is interposed between pixel expansion layer 64 and the output surface of optical coupling layer 16. Adhesive layers 62 and 66 may be optically clear adhesive (OCA), liquid optically clear adhesive (LOCA), or any other desired type of adhesive.

Diffractive layer 64 may be separated from the output surface of optical coupling layer 16 by a distance 68. In FIG. 4, distance 68 is equivalent to the thickness of adhesive layer 62. However, this need not be the case, such as in arrangements where adhesive layer 62 is omitted and/or additional layers are included between diffractive layer 64 and optical coupling layer 16. Distance 68 may effect the performance of the diffractive layer and may be selected to optimize the performance of the diffractive layer, as will be discussed in greater detail in connection with FIG. 12.

Herein, the term pixel may be used to refer to both a light-emitting component on display panel 14, a light-emitting area on the output surface of optical coupling layer 16, and a light-emitting area on the outer surface of display cover layer 32 (e.g., on the outer surface of protective layer 30). The pixels at the output surface of the optical coupling layer may have a different arrangement (e.g., different sizes, spacing, positions, etc.) than the pixels on the display panel due to the translation and expansion caused by the optical coupling layer. The pixels at the outer surface of the display cover layer may have a different arrangement than on the output surface of the optical coupling layer due to the pixel expansion performed by pixel expansion layer 64.

Figures 5A, 5B:
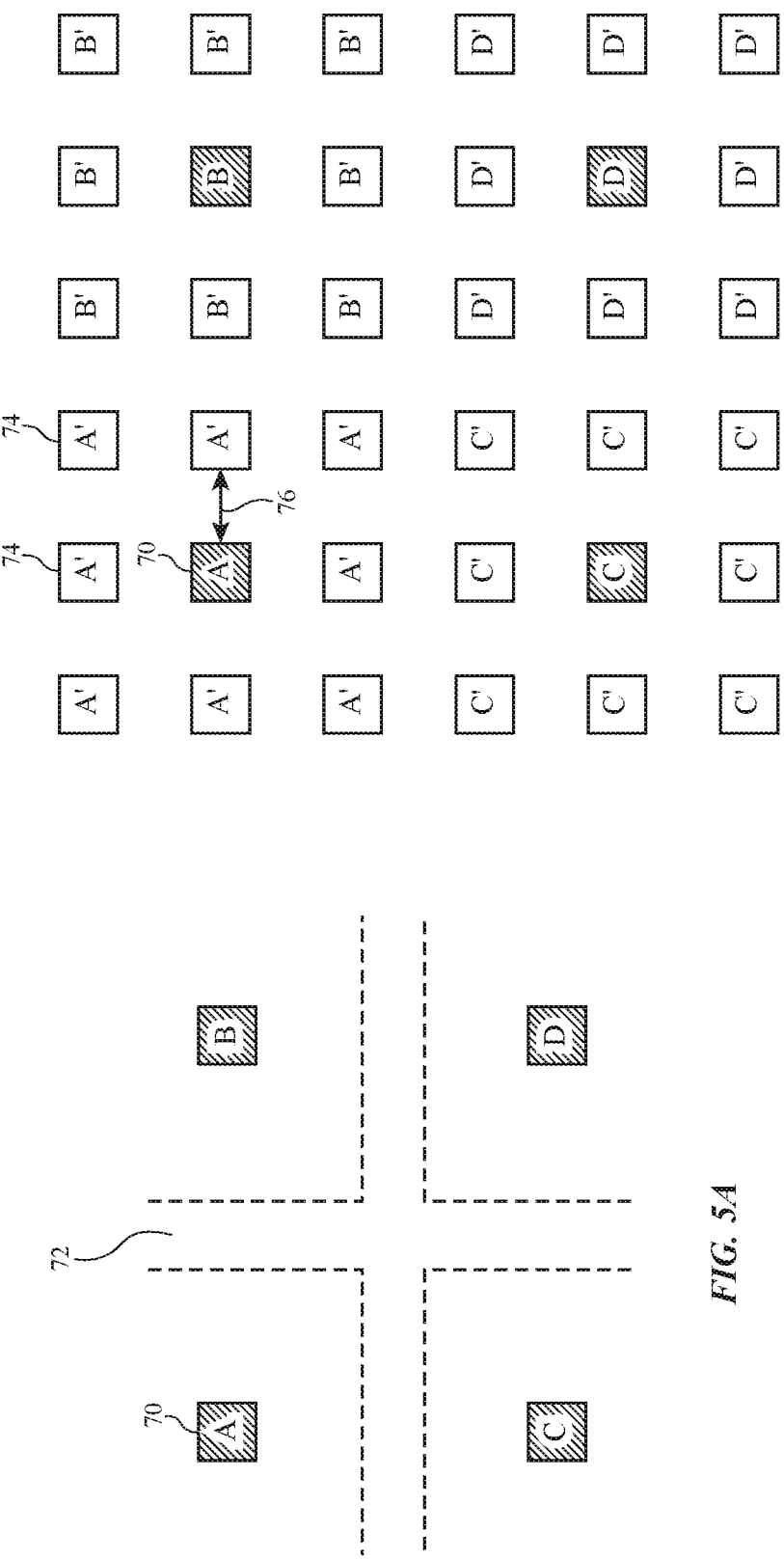
FIGS. 5A and 5B are top views of illustrative pixels showing how the diffractive layer of FIG. 4 mitigates a screen-door effect in accordance with an embodiment.

FIGS. 5A and 5B are top views of illustrative pixels on an output surface of a display cover layer showing how a diffractive layer such as diffractive layer 64 may mitigate the screen-door effect. FIG. 5A shows pixels on the output surface of the display cover layer (e.g., the outer surface of protective layer 30) without diffractive layer 64 present. FIG. 5B shows pixels on the output surface of the display cover layer when diffractive layer 64 is present. FIG. 5A shows four pixels 70 (A, B, C, and D) arranged in a 2×2 grid. Without diffractive layer 64, a dark band 72 may be formed in a mesh-like pattern between the pixels. Dark band 72 (sometimes referred to as a screen-door pattern) may be present due to relatively large spacing between pixels 70. The area of dark band 72 is not illuminated by any of the pixels and therefore appears black when viewed by a user.

Diffractive layer 64 may create duplicate pixels that occupy the space between the original pixels to eliminate the presence of the dark band between the pixels. FIG. 5B again has four pixels 70 (A, B, C, and D) arranged in a 2×2 grid on the output surface of the display cover layer. However, diffractive layer 64 creates duplicate pixels 74 that are then present on the outer surface of the display cover layer in addition to pixels 70. Diffractive layer 64 may create any desired number of duplicate pixels. In the example of FIG. 5B, diffractive layer 64 creates 8 duplicate pixels that are arranged in a grid-like pattern around each original pixel. Pixel A has 8 associated duplicate pixels A', pixel B has 8 associated duplicate pixels B', pixel C has 8 associated duplicate pixels C', and pixel D has 8 associated duplicate pixels D'. Because pixels 70 are originally present on the output surface of optical coupling layer 16, pixels 70 may sometimes be referred to as original pixels (in contrast to the duplicate pixels 74 which are not present on the output surface of optical coupling layer 16).

The duplicate pixels 74 generated by diffractive layer 64 occupy the space between original pixels 70. Thus, the gap in light-emitting area between the original pixels (band 72 from FIG. 5A) is not present. The diffractive layer therefore mitigates the screen-door effect by generating duplicate pixels to occupy the space between the original pixels on the output surface of the display cover layer.

In FIG. 5B, each duplicate pixel may be separated from its associated original pixel by a distance 76. Distance 76 may be greater than 5 micron, greater than 10 micron, greater than 25 micron, greater than 50 micron, greater than 70 micron, greater than 100 micron, greater than 500 micron, less than 200 micron, less than 100 micron, less than 50 micron, between 20 and 100 micron, etc. Distance 76 may be tuned depending on the spacing between original pixels 70. Distance 76 may be more than 10% of the distance between adjacent original pixels 70, more than 30% of the distance between adjacent original pixels 70, less than 50% of the distance between adjacent original pixels 70, between 10% and 50% of the distance between adjacent original pixels 70, between 20% and 40% of the distance between adjacent original pixels 70, etc. Distance 76 may, for example, be selected such that the duplicate pixels occupy the non-light-emitting areas between original pixels without overlapping adjacent original pixels or adjacent duplicate pixels.

The example in FIG. 5B of each original pixel having 8 associated duplicate pixels is merely illustrative. Each original pixel may have more than 2 associated duplicate pixels, more than 4 associated duplicate pixels, more than 6 associated duplicate pixels, more than 8 associated duplicate pixels, more than 10 associated duplicate pixels, less than 10 associated duplicate pixels, between 4 and 10 associated duplicate pixels, 1 associated duplicate pixel, etc. The depiction of discrete duplicate pixels in FIG. 5B is also merely illustrative. In some cases, a duplicate light-emitting area may be created by diffractive layer 64 that has a different shape than original pixel 70. For example, a duplicate pixel may be formed by a continuous ring of light that surrounds an original pixel and duplicates the light from the original pixel.

Diffractive layer 64 may be formed in a variety of different ways. In one example, shown in FIG. 6, diffractive layer 64 has a first layer 82 with a varying thickness. A second layer 84 may conform to the first layer. Layer 84 has a planar upper surface in FIG. 6 and therefore also has a varying thickness. Layers 82 and 84 may have different refractive indices. The difference in refractive indices may cause diffraction at the interface between layers 82 and 84 when light passes through the diffractive layer.

Layer 82 has first portions with a first thickness 86 and second portions with a second thickness 88. Thickness 88 is smaller than thickness 86, creating gaps above the second portions and between the first portions. Layer 84 fills these gaps, creating a difference in refractive index in a plane (parallel to the XY-plane) that includes both portions of layer 84 and portions or layer 82.

Layers 82 and 84 may be formed from any desired material. The layers may be formed from a transparent polymer material in one example (e.g., photopolymer). In some cases, layer 82 and/or 84 may be formed from a layer that has another function in the electronic device. For example, layer 82 and/or layer 84 may be an adhesive layer. Layer 84 may be formed by adhesive layer 66 in FIG. 4, as one example. Layer 82 may be formed by adhesive layer 62 in FIG. 4, in another example. One of layers 82 and 84 may be formed from air (e.g., an air gap) if desired.

Thicknesses 86 and 88 may each be less than 3 micron, less than 5 micron, less than 10 micron, less than 20 micron, less than 50 micron, less than 1 micron, greater than 0.1 micron, greater than 1 micron, greater than 50 micron, between 1 and 10 micron, etc. The difference between the two thicknesses may be less than 3 micron, less than 5 micron, less than 10 micron, less than 20 micron, less than 50 micron, less than 1 micron, greater than 0.1 micron, greater than 1 micron, greater than 50 micron, between 1 and 10 micron, etc. Each one of layers 82 and 84 may have a refractive index that is greater than 1.0, greater than 1.2, greater than 1.3, greater than 1.4, greater than 1.5, greater than 1.6, less than 1.7, less than 1.5, less than 1.3, between 1.1 and 1.5, etc. The difference between the refractive indices of layers 82 and 84 may be greater than 0.1, greater than 0.2, greater than 0.3, greater than 0.5, less than 0.5, less than 0.3, between 0.1 and 0.5, between 0.1, and 0.3, etc.

Each portion of layer 86 with thickness 86 may sometimes be referred to as a diffractive element or diffractive structure. The repeating diffractive elements may be separated by pitch 90. Pitch 90 may be less than 10 micron, less than 15 micron, less than 20 micron, less than 50 micron, less than 100 micron, greater than 5 micron, greater than 10 micron, greater than 15 micron, greater than 20 micron, between 1 and 20 micron, between 5 and 10 micron, etc. Adhesive layers may be formed on either side of the diffractive layer of FIG. 6. For example, an adhesive layer such as adhesive layer 66 in FIG. 4 may be formed adjacent layer 84 such that layer 84 is interposed between layer 82 and adhesive layer 66. Additionally or instead, an adhesive layer such as adhesive layer 62 in FIG. 4 may be formed adjacent layer 82 such that layer 82 is interposed between layer 84 and adhesive layer 62.

Figure 6:
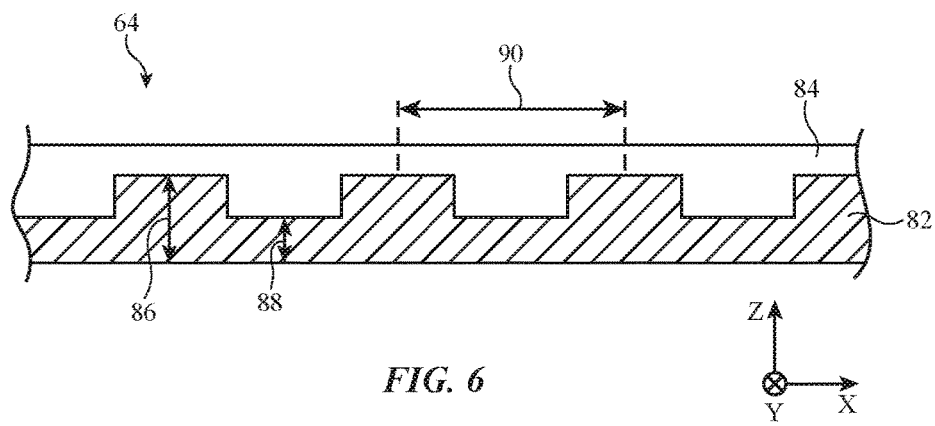
FIG. 6 is a cross-sectional side view of an illustrative diffractive layer that includes layers having different refractive indices and varying thicknesses in accordance with an embodiment.
Figure 7A:
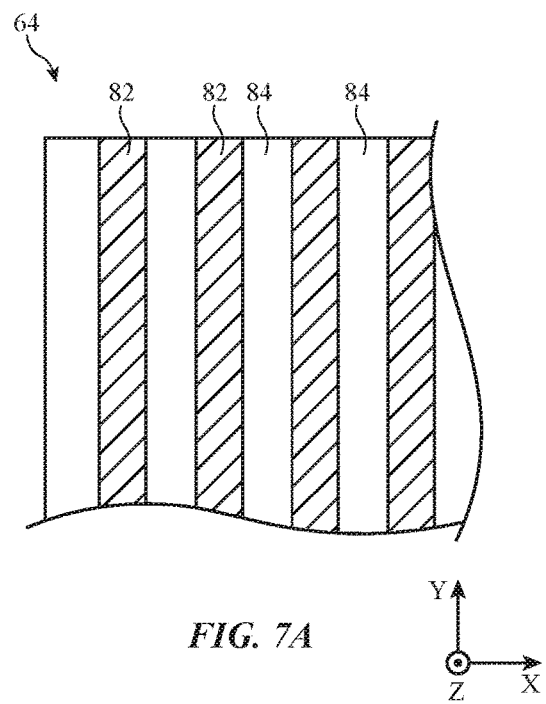
FIGS. 7A and 7B are top views showing illustrative patterns for the diffractive layer of FIG. 6 in accordance with an embodiment.
Figure 7B:
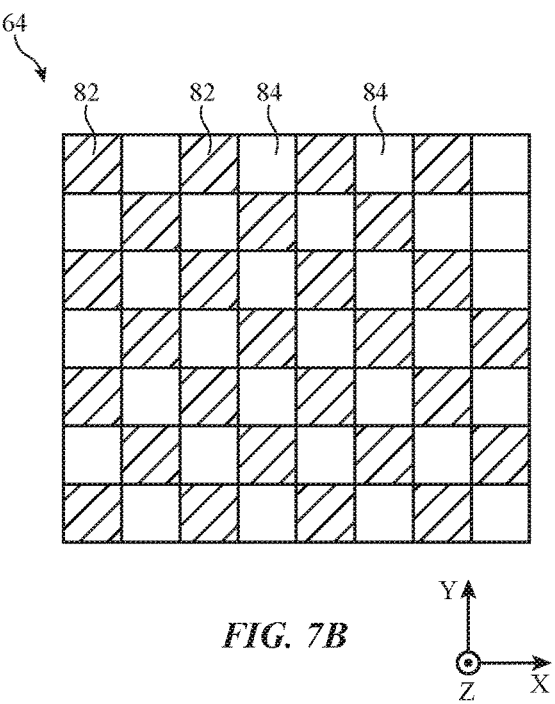

FIGS. 7A and 7B are top views showing various arrangements for the diffractive elements of the diffractive layer of FIG. 6. In FIG. 7A, the thicker portions of layer 82 extend in strips across the diffractive layer. The strips of layer 82 are separated by strips of layer 84 (e.g., a strip of layer 84 is interposed between each pair of adjacent strips of layer 82). This example is merely illustrative. In an alternate arrangement, shown in FIG. 7B, layers 82 and 84 may be arranged in a checkerboard pattern across the diffractive layer. Each square of layer 82 may be laterally surrounded by four squares of layer 84 and each square of layer 84 may be laterally surrounded by four squares of layer 82. These patterns for the diffractive elements are merely illustrative and other patterns may be used if desired.

Figure 8:
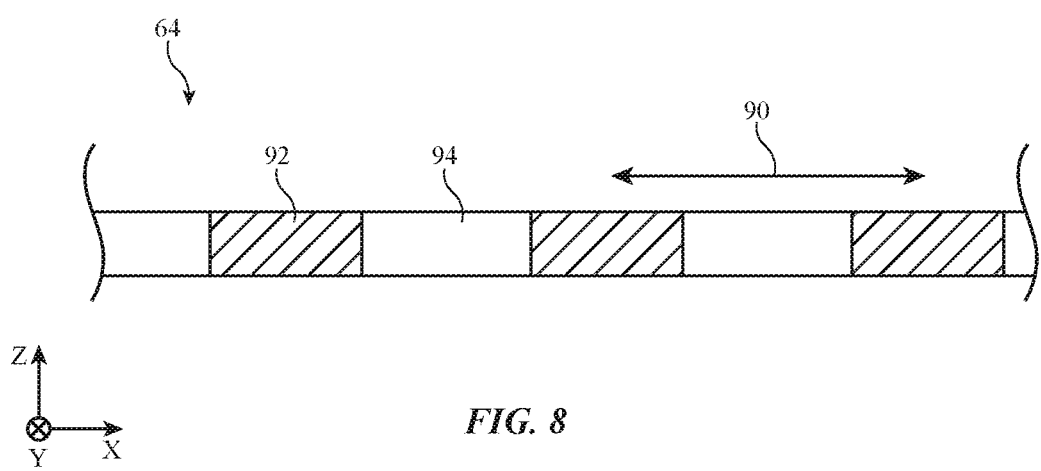
FIG. 8 is a cross-sectional side view of an illustrative diffractive layer that includes a single layer with different portions having different refractive indices in accordance with an embodiment.

In FIGS. 6 and 7, diffractive layer 64 is formed by a first layer having a varying thickness and a second layer that conforms to the first layer and that has a different refractive index than the first layer. In another possible arrangement, shown in FIG. 8, diffractive layer 64 may be formed from a single layer that has a varying index of refraction within the XY-plane. As shown in FIG. 8, diffractive layer 64 may have first portions 92 with a first refractive index and coplanar second portions 94 with a second refractive index that is different than the first refractive index.

Portions 92 and 94 of diffractive layer 64 may be formed from any desired material. The layers may be formed from a transparent polymer material in one example (e.g., photopolymer). In some cases, portions 92 and/or portions 94 may be formed from a layer that has another function in the electronic device (e.g., an adhesive layer such as adhesive layer 62 or adhesive layer 66 from FIG. 4). Each one of portions 92 and 94 may have a refractive index that is greater than 1.0, greater than 1.2, greater than 1.3, greater than 1.4, greater than 1.5, greater than 1.6, less than 1.7, less than 1.5, less than 1.3, between 1.1 and 1.5, etc. The difference between the refractive indices of portions 92 and 94 may be greater than 0.1, greater than 0.2, greater than 0.3, greater than 0.5, less than 0.5, less than 0.3, between 0.1 and 0.5, between 0.1, and 0.3, etc. The repeating diffractive elements may be separated by pitch 90. Pitch 90 may be less than 10 micron, less than 15 micron, less than 20 micron, less than 50 micron, less than 100 micron, greater than 5 micron, greater than 10 micron, greater than 15 micron, greater than 20 micron, between 1 and 20 micron, between 5 and 10 micron, etc. Adhesive layers may be formed on either side of the diffractive layer of FIG. 8.

The diffractive elements of FIG. 8 may be arranged in the pattern of FIG. 7A, the pattern of FIG. 7B, or any other desired pattern.

The diffractive layer may have a gradual thickness change instead of a thickness step change as in FIG. 6. FIGS. 9A and 9B are cross-sectional side views of an illustrative diffractive layer with a gradual thickness change. As shown in FIG. 9A, the thickness of layer 82 may vary in a curved pattern (sometimes referred to as a serpentine pattern, sinusoidal pattern, or wavy pattern) in the X-direction. Similarly, as shown in FIG. 9B, the thickness of layer 82 may vary in a curved pattern (sometimes referred to as a serpentine pattern, sinusoidal pattern, or wavy pattern) in the Y-direction. Layer 84 may conform to layer 82.

Layers 82 and 84 in FIGS. 9A and 9B may be formed from any desired material. The layers may be formed from a transparent polymer material in one example (e.g., photopolymer). In some cases, layer 82 and/or 84 may be formed from a layer that has another function in the electronic device. For example, layer 82 and/or layer 84 may be an adhesive layer. Layer 84 may be formed by adhesive layer 66 in FIG. 4, as one example. Layer 82 may be formed by adhesive layer 62 in FIG. 4, in another example. One of layers 82 and 84 may be formed from air (e.g., an air gap) if desired.

Layer 82 may have an associated maximum thickness 96 and an associated minimum thickness 98. Thicknesses 96 and 98 may each be less than 3 micron, less than 5 micron, less than 10 micron, less than 20 micron, less than 50 micron, less than 1 micron, greater than 0.1 micron, greater than 1 micron, greater than 50 micron, between 1 and 10 micron, etc. The difference between thicknesses 96 and 98 may be less than 3 micron, less than 5 micron, less than 10 micron, less than 20 micron, less than 50 micron, less than 1 micron, greater than 0.1 micron, greater than 1 micron, greater than 50 micron, between 1 and 10 micron, etc. Each one of layers 82 and 84 may have a refractive index that is greater than 1.0, greater than 1.2, greater than 1.3, greater than 1.4, greater than 1.5, greater than 1.6, less than 1.7, less than 1.5, less than 1.3, between 1.1 and 1.5, etc. The difference between the refractive indices of layers 82 and 84 may be greater than 0.1, greater than 0.2, greater than 0.3, greater than 0.5, less than 0.5, less than 0.3, between 0.1 and 0.5, between 0.1, and 0.3, etc.

FIG. 9C is a top view of the diffractive layer shown in FIGS. 9A and 9B. As shown, the sinusoidal thickness variation in both the X and Y directions may result in an array of diffractive structures 100 (sometimes referred to as diffractive elements) being formed across the diffractive layer. Each diffractive structure may be a dome-shaped protrusion of layer 82 formed by the thickness profiles of FIGS. 9A and 9B. The diffractive layer may be referred to as having an egg-carton or egg-crate shape due to the array of curved, dome-like protrusions that extend in a grid across the diffractive layer.

The repeating diffractive structures 100 may be separated by pitch 90. Pitch 90 may be less than 10 micron, less than 15 micron, less than 20 micron, less than 50 micron, less than 100 micron, greater than 5 micron, greater than 10 micron, greater than 15 micron, greater than 20 micron, between 1 and 20 micron, between 5 and 10 micron, etc. Adhesive layers may be formed on either side of the diffractive layer of FIGS. 9A-9C. For example, an adhesive layer such as adhesive layer 66 in FIG. 4 may be formed adjacent layer 84 such that layer 84 is interposed between layer 82 and adhesive layer 66. Additionally or instead, an adhesive layer such as adhesive layer 62 in FIG. 4 may be formed adjacent layer 82 such that layer 82 is interposed between layer 84 and adhesive layer 62.

As discussed in connection with FIG. 5B, the diffractive layer may result in duplicate pixels that are separated from the associated original pixel by a distance 76. The distance 76 between the duplicate pixel and original pixel may be tuned to optimally reduce screen-door effect while mitigating blur in the display. However, the optimal magnitude for distance 76 may be dependent upon the distance between adjacent original pixels within the display.

Referring to FIG. 5B, the distance between adjacent pixels (e.g., pixel A and pixel B) on the output surface of the optical coupling layer may vary across the display. In particular, the optical coupling layer expansion may increase towards the edges of the optical coupling layer. Therefore, the distance between pixels on the output surface of the optical coupling layer may increase towards the edge of the optical coupling layer. Accordingly, the design of the diffractive layer may vary across the diffractive layer to compensate for the variation in the expansion of the display.

Distance 76 in FIG. 5B may be controlled by a variety factors, any or all of which may be tuned to optimize performance of the diffractive layer. The pitch of the diffractive elements of the diffractive layer (e.g., pitch 90 in FIGS. 6, 8, and 9C) may affect the magnitude of distance 76 in FIG. 5B. As the pitch of the diffractive elements increases, distance 76 will decrease. In other words, distance 76 between the duplicate pixel produced by the diffractive layer and the associated original pixel is inversely proportional to the pitch of the diffractive elements of the diffractive layer. Therefore, as the distance between the original pixels increases towards the edge of the optical coupling layer, the pitch of the diffractive elements may decrease.

Figure 10:
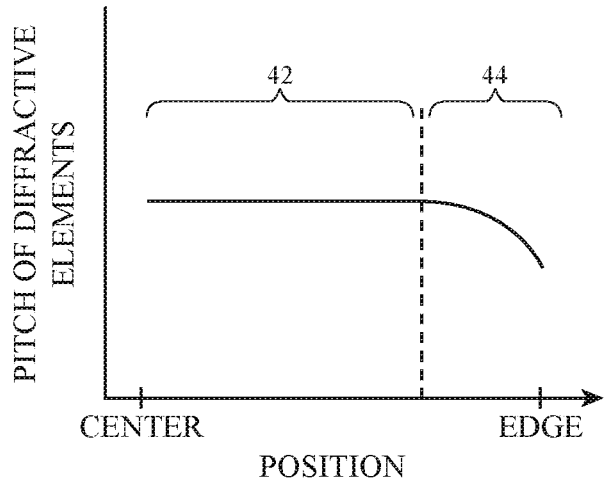
FIG. 10 is a graph showing an illustrative relationship between the pitch of diffractive elements and position on the diffractive layer in accordance with an embodiment.

FIG. 10 is a graph showing the relationship between the pitch of the diffractive elements and the position on the diffractive layer. As shown, in a portion of the diffractive layer corresponding to central portion 42 of the optical coupling layer, there may be a relatively constant pitch (because central portion 42 of the optical coupling layer has a relatively constant pixel spacing). However, in peripheral portion 44 of the optical coupling layer, the pixel spacing may increase as the pixel position moves closer to the edge of the optical coupling layer. Accordingly, as shown in FIG. 10, the pitch of the diffractive elements may decrease as the position within the diffractive layer moves closer to the edge of the diffractive layer.

The refractive index difference (Δn) of the diffractive layer (e.g., the refractive index difference between layers 82 and 84 in FIG. 6, the refractive index difference between portions 92 and 94 in FIG. 8, the refractive index difference between layers 82 and 84 in FIG. 9, etc.) may affect the magnitude of distance 76 in FIG. 5B. As the refractive index difference increases, distance 76 will increase. In other words, distance 76 between the duplicate pixel produced by the diffractive layer and the associated original pixel is proportional to the refractive index difference of the diffractive layer. Therefore, as the distance between the original pixels increases towards the edge of the optical coupling layer, the refractive index difference of the diffractive elements may increase.

Figure 11:
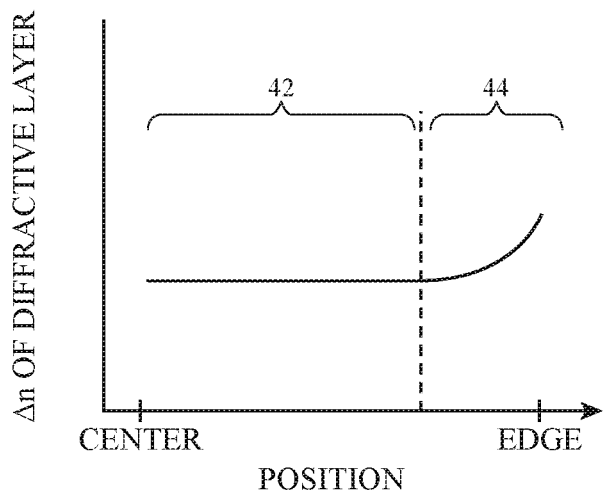
FIG. 11 is a graph showing an illustrative relationship between the refractive index difference of the diffractive layer and position on the diffractive layer in accordance with an embodiment.

FIG. 11 is a graph showing the relationship between the refractive index difference of the diffractive layer and the position on the diffractive layer. As shown, in a portion of the diffractive layer corresponding to central portion 42 of the optical coupling layer, there may be a relatively constant refractive index difference (because central portion 42 of the optical coupling layer has a relatively constant pixel spacing). However, in peripheral portion 44 of the optical coupling layer, the pixel spacing may increase as the pixel position moves closer to the edge of the optical coupling layer. Accordingly, as shown in FIG. 11, the refractive index difference may increase as the position within the diffractive layer moves closer to the edge of the diffractive layer.

The distance between the diffractive layer and the optical coupling layer (e.g., distance 68 in FIG. 4) may affect the magnitude of distance 76 in FIG. 5B. As the magnitude of distance 68 between the diffractive layer and the optical coupling layer increases, distance 76 will increase. In other words, distance 76 between the duplicate pixel produced by the diffractive layer and the associated original pixel is proportional to the distance between the diffractive layer and the optical coupling layer. Therefore, as the distance between the original pixels increases towards the edge of the optical coupling layer, the distance between the diffractive layer and the optical coupling layer may increase.

Figure 12:
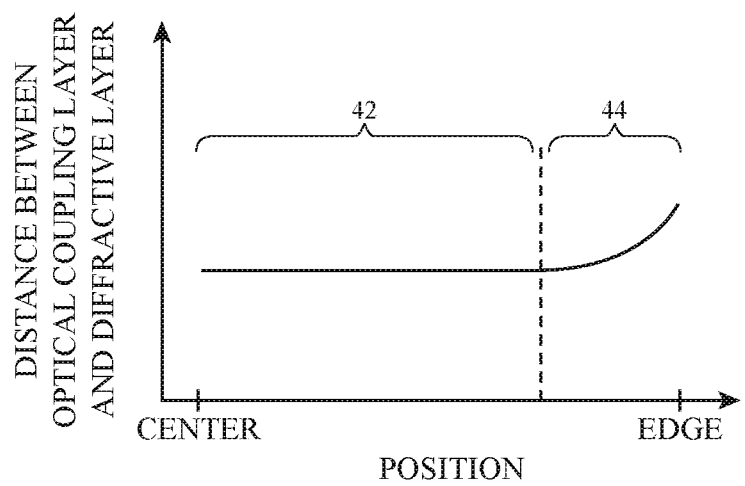
FIG. 12 is a graph showing an illustrative relationship between the distance between the optical coupling layer and the diffractive layer and position on the diffractive layer in accordance with an embodiment.

FIG. 12 is a graph showing the relationship between the distance between the diffractive layer and the optical coupling layer and the position on the diffractive layer. As shown, in a portion of the diffractive layer corresponding to central portion 42 of the optical coupling layer, there may be a relatively constant distance between the diffractive layer and the optical coupling layer (because central portion 42 of the optical coupling layer has a relatively constant pixel spacing). However, in peripheral portion 44 of the optical coupling layer, the pixel spacing may increase as the pixel position moves closer to the edge of the optical coupling layer. Accordingly, as shown in FIG. 12, the distance between the diffractive layer and the optical coupling layer may increase as the position within the diffractive layer moves closer to the edge of the diffractive layer.

Other properties of the diffractive layer may vary based on position on the diffractive layer if desired.

As previously mentioned, the diffractive layer 64 may include layers that serve additional functions within the electronic device. Examples of adhesive layers forming part of the diffractive layer have previously been discussed. As another example, the diffractive layer may be at least partially formed by transparent protective layer 30.

Figure 13:
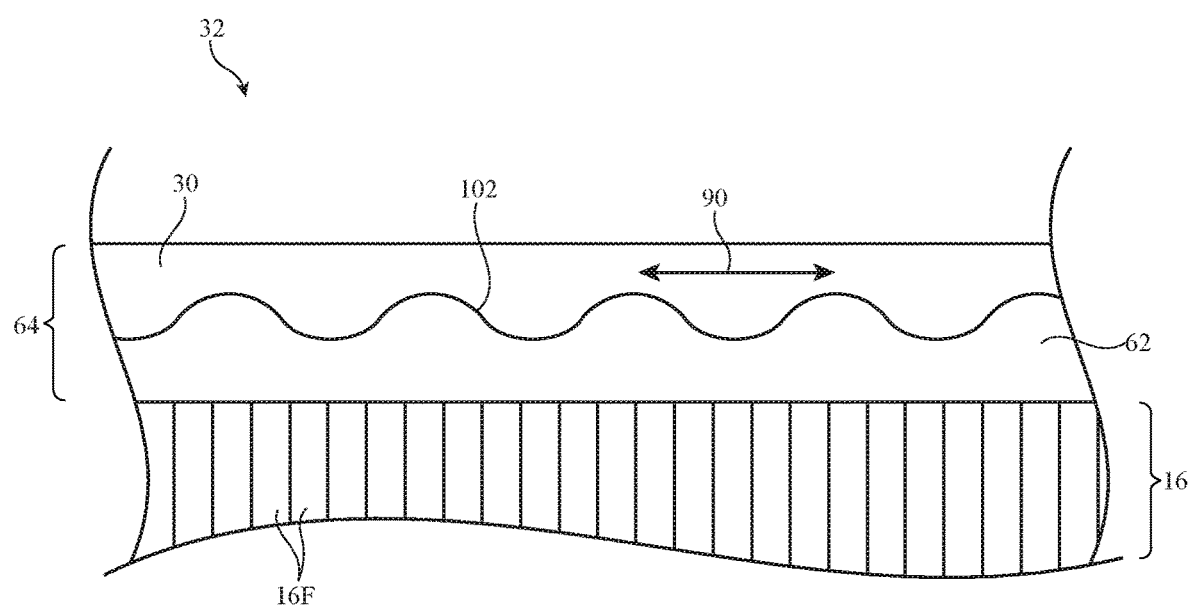
FIG. 13 is a cross-sectional side view of an illustrative display cover layer with diffractive elements formed by recesses on an inner surface of a transparent protective layer in accordance with an embodiment.

FIG. 13 is a cross-sectional side view of an illustrative display cover layer 32 with a protective layer that also forms part of a diffractive layer for the electronic device. As shown in FIG. 13, diffractive layer 64 may include protective layer 30. Protective layer 30 may be formed from a layer of glass, clear polymer, crystalline material such as sapphire or other crystalline material, and/or other transparent material. The presence of layer 30 may help protect the outer surface of layer 16 from scratches. The inner surface 102 of protective layer 30 may be patterned or etched to have thickness variations (e.g., recesses) of the type shown in FIG. 6 or FIG. 9. An adhesive layer 62 may be interposed between protective layer 30 and optical coupling layer 16. The adhesive layer 62 may conform to the inner surface of the protective layer and fill the recesses on the inner surface of the protective layer. There may be a refractive index difference between protective layer 30 and adhesive layer 62. Therefore protective layer 30 and adhesive layer 62 form diffractive layer 64 and mitigate the screen-door effect.

The diffractive elements formed by the recesses on the inner surface of protective layer 30 may have any desired shape and size (e.g., the arrangement of FIG. 6, the arrangement of FIG. 9, etc.). Each one of protective layer 30 and adhesive layer 62 may have a refractive index that is greater than 1.0, greater than 1.2, greater than 1.3, greater than 1.4, greater than 1.5, greater than 1.6, less than 1.7, less than 1.5, less than 1.3, between 1.1 and 1.5, etc. The difference between the refractive indices of layers 30 and 62 may be greater than 0.1, greater than 0.2, greater than 0.3, greater than 0.5, less than 0.5, less than 0.3, between 0.1 and 0.5, between 0.1, and 0.3, etc. Pitch 90 between diffractive elements formed by protective layer 30 may be less than 10 micron, less than 15 micron, less than 20 micron, less than 50 micron, less than 100 micron, greater than 5 micron, greater than 10 micron, greater than 15 micron, greater than 20 micron, between 1 and 20 micron, between 5 and 10 micron, etc.

In addition to mitigating the screen-door effect, the diffractive layer may be used to mitigate additional visible artifacts such as the sparkle effect. Sparkle may refer to a variance in brightness in the display caused by the optical coupling layer. The optical coupling layer may include a plurality of optical fibers, as shown in connection with FIG. 3. Some pixels in display panel 14 may be overlapped by more fibers than others. For example, consider an example where a first pixel on the display panel is overlapped by four fibers and a second pixel on the display panel is overlapped by five fibers. When the first and second pixels attempt to display pixel data having the same brightness, the actual perceived brightness of the first pixel may be lower than the perceived brightness of the second pixel (due to less of the light being conveyed by the optical coupling layer for the first pixel than the second pixel). This type of variance may result in brightness variations across the display. For example, if a solid white image is displayed on the display panel, the viewer may perceive different brightness levels even though the brightness is meant to be uniform. This type of visible artifact may be referred to as the sparkle effect or simply sparkle.

Figure 14:
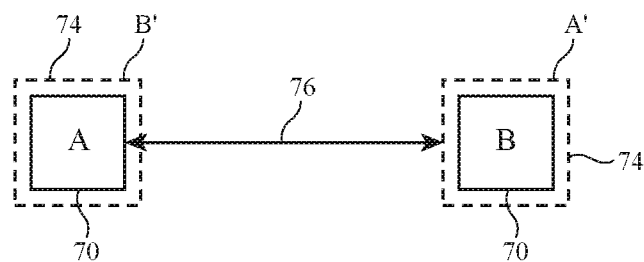
FIG. 14 is a top view of illustrative pixels showing how the diffractive layer may create duplicate pixels that overlap adjacent original pixels to mitigate a sparkle effect in accordance with an embodiment.

To mitigate sparkle within the display, the diffractive layer may create duplicate pixels that overlap adjacent pixels within the display. FIG. 14 shows two adjacent pixels 70 (A and B). Diffractive layer 64 may create duplicate pixels that overlap the adjacent original pixels to average the brightness of the two pixels and reduce brightness variations caused by the optical coupling layer. Diffractive layer 64 creates duplicate pixels 74 that are then present on the outer surface of the display cover layer in addition to pixels 70.

As shown in FIG. 14, the diffractive layer is designed to create duplicate pixels that overlap an adjacent original pixel. For example, duplicate pixel A' overlaps original pixel B and duplicate pixel B' overlaps original pixel A. Diffractive layer 64 may be designed such that distance 76 between the original pixel and associated duplicate pixel is approximately equivalent to the distance between two adjacent original pixels.

As a result of the duplicate pixels overlapping adjacent original pixels, brightness averaging occurs and smooths out any brightness variations in the original pixels. Consider an example where original pixel A has a relative brightness of 100% and original pixel B has a relative brightness of 80%. Duplicate pixel A' (which also has a relative brightness of 100%) overlaps original pixel B. The perceived brightness in this area will therefore be the average brightness of original pixel B and duplicate pixel A' (equal to 90% in this example). Duplicate pixel B' (which also has a relative brightness of 80%) overlaps original pixel A. The perceived brightness in this area will therefore be the average brightness of original pixel A and duplicate pixel B' (equal to 90% in this example). Therefore, the perceived brightness in both areas is the same (e.g., 90%), despite the brightness differences in the original pixels.

A diffractive layer 64 having any of the aforementioned structures may be used to mitigate sparkle in the display. The diffractive layer may have diffractive elements of the type shown in FIG. 6, 8, or 9. The diffractive layer may be designed such that distance 76 between the duplicate pixel and the associated original pixel results in the duplicate pixel overlapping an adjacent original pixel.

The optimal diffractive layer design to mitigate the screen-door effect (with duplicate pixels in an otherwise black area between pixels) may be different than the optimal diffractive layer design to mitigate the sparkle (with duplicate pixels that overlap adjacent original pixels). The design of the diffractive layer may therefore depend on the specific priorities of a particular device. In some cases, the diffractive layer may be designed to prioritize mitigation of different visible artifacts in different areas of the diffractive layer. For example, a first portion of the diffractive layer may be used to mitigate sparkle and a second portion of the diffractive layer may be used to mitigate the screen-door effect.

Figure 15:
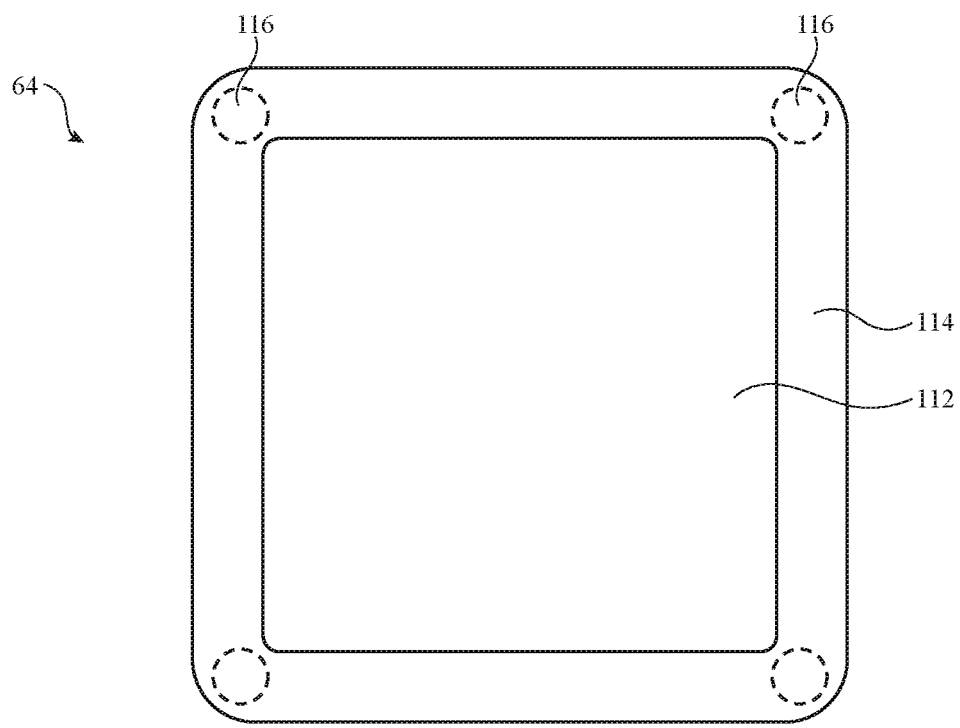
FIG. 15 is a top view of an illustrative diffractive layer with different properties in different portions in accordance with an embodiment.

FIG. 15 is a top view of a diffractive layer with a first portion used to mitigate sparkle and a second portion used to mitigate the screen-door effect. As shown, diffractive layer 64 has a central portion 112. Central portion 112 of the diffractive layer may overlap central portion 42 of optical coupling layer 16. In central portion 42 of the optical coupling layer, there may be little to no fiber expansion. Therefore, the display resolution of the display panel may be maintained at the output surface of central portion 42. Accordingly, the screen-door effect may not be very perceptible (if perceptible at all) to the viewer. Therefore, central portion 112 of the diffractive layer may have a design that mitigates sparkle.

Peripheral portion 114 of the diffractive layer may overlap peripheral portion 44 of optical coupling layer 16. In peripheral portion 44 of the optical coupling layer, the fibers may be expanded as discussed in connection with FIG. 2. Therefore, the screen-door effect may be more prevalent in peripheral portion 44 of the optical coupling layer. Accordingly, peripheral portion 114 of diffractive layer 64 may have a design that mitigates screen-door effect. The pitch of the diffraction elements, the refractive index difference of the diffractive layer, the distance between the optical coupling layer and the diffractive layer, and/or other diffractive layer properties may be different in portions 112 and 114.

The structure of the diffractive elements of the diffractive layer may also be different in corner portions 116 of the diffractive layer. The alignment of the grid of diffraction elements may, for example, be adjusted in the corner portions 116 to account for the geometry of the corner portions.

In the embodiments of FIG. 4, the diffractive layer 64 is depicted as being formed between optical coupling layer 16 and protective layer 30. In other words, the diffractive layer 64 is formed at the output surface of the optical coupling layer. However, when compensating for sparkle, the diffractive layer may instead be positioned between the optical coupling layer and the display panel (at the input surface of the optical coupling layer).

Figure 16:
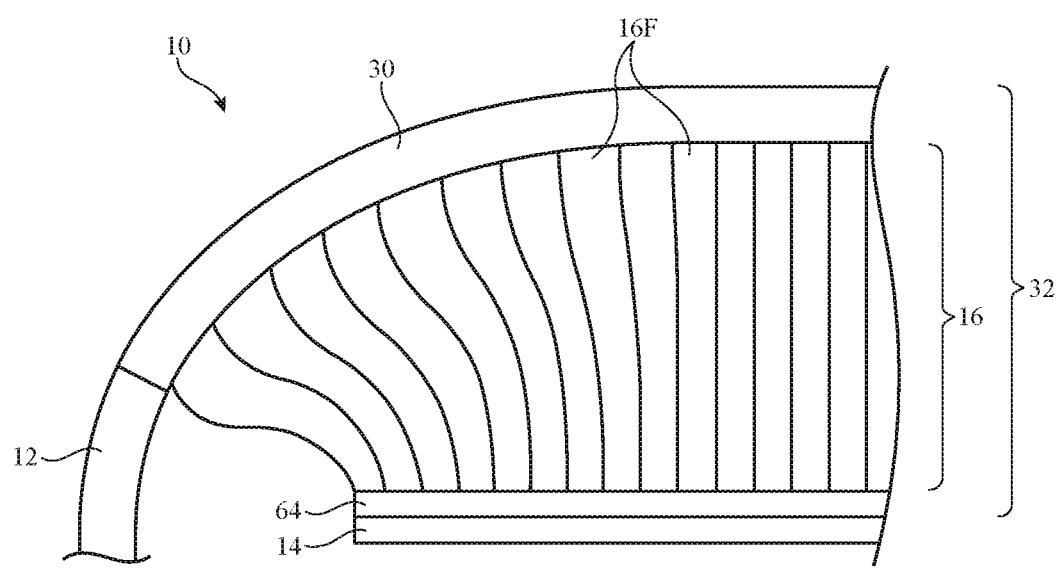
FIG. 16 is a side view of an illustrative electronic device with a diffractive layer interposed between the optical coupling layer and the display panel in accordance with an embodiment.

FIG. 16 is a cross-sectional side view of an electronic device with a diffractive layer that is interposed between the optical coupling layer and the display panel. The diffractive layer in FIG. 16 may have any of the structures previously described in connection with FIGS. 6-9. Adhesive layers may optionally be formed on either side of the diffractive layer between display panel 14 and optical coupling layer 16. When diffractive layer 64 is formed at the input surface of the optical coupling layer as in FIG. 16, the diffractive layer may be used to compensate for the sparkle effect but not the screen-door effect. Therefore, diffractive layer 64 in FIG. 16 may be optimized to mitigate sparkle across the entire diffractive layer (instead of prioritizing screen-door effect in a peripheral portion as in FIG. 15). A second diffractive layer may be included between optical coupling layer 16 and protective layer 30 to mitigate screen-door effect in addition to the diffractive layer 64 that is interposed between optical coupling layer 16 and display panel 14.

Figure 17:
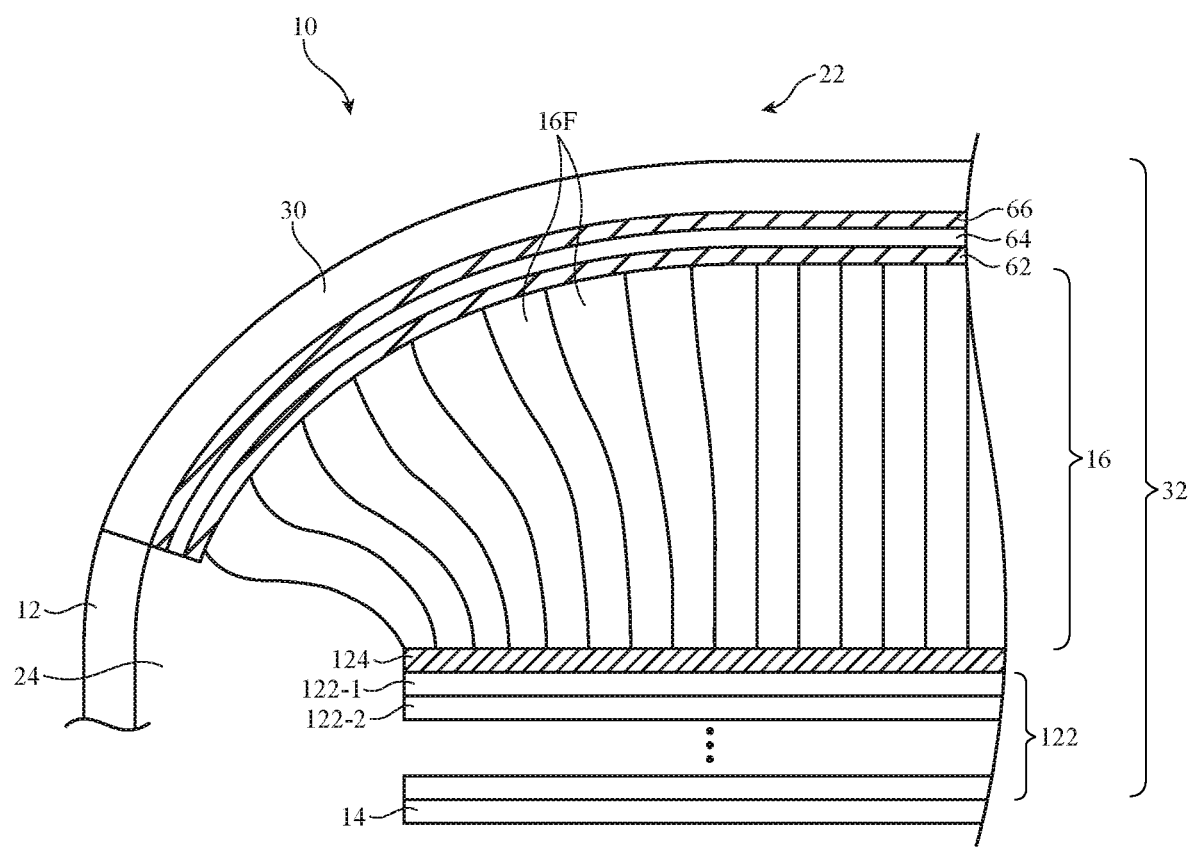
FIG. 17 is a side view of an illustrative electronic device with an adhesive layer having a high refractive index interposed between the optical coupling layer and the display panel in accordance with an embodiment.

FIG. 17 is a cross-sectional side view of an electronic device with a cover glass that includes a high-index-of-refraction adhesive layer between the display panel and the optical coupling layer. Electronic device 10 in FIG. 17 has a similar arrangement to the electronic device of FIG. 4, with diffractive layer 64 interposed between optical coupling layer 16 and protective layer 30. However, FIG. 17 also shows how additional optical films 122 may be formed over display panel 14. An adhesive layer 124 is interposed between optical films 122 and optical coupling layer 16.

Adhesive layer 124 may have a high refractive index to prevent undesired reflections of ambient light. If the refractive index of adhesive layer 124 is not sufficiently high, ambient light from exterior 22 may be guided through fibers 16F towards adhesive layer 124 and reflect off of the interface between fibers 16F and adhesive layer 124 (due to total internal reflection). The ambient light is thus reflected back towards the viewer, undesirably reducing contrast in the display and resulting in visible artifacts.

When the refractive index of adhesive layer 124 is sufficiently high, the ambient light may pass through adhesive layer 124 and ultimately be absorbed by optical films 122 (e.g., a circular polarizer within optical films 122). The refractive index of adhesive layer 124 may be greater than 1.5, greater than 1.55, greater than 1.6, greater than 1.65, greater than 1.7, between 1.55 and 1.75, less than 1.75, etc. The difference in refractive index between adhesive layer 124 and the fiber cores (e.g., cores 54 in FIG. 3) may be less than 0.3, less than 0.2, less than 0.1, less than 0.05, less than 0.02, greater than 0.01, between 0.01 and 0.1, between 0.05 and 0.2, etc.

The optical films 122 may also have refractive indices selected to mitigate undesired reflections of ambient light. For example, optical film 122-1 may be a quarter wave plate. Optical film 122-2 may be a linear polarizer. Optical films 122-1 and/or 122-2 may form part of a circular polarizer. Optical films 122-1 and 122-2 may have refractive indices selected to be greater than 1.5, greater than 1.55, greater than 1.6, greater than 1.65, greater than 1.7, between 1.55 and 1.75, less than 1.75, etc. The difference in refractive index between adhesive layer 124 and optical film 122-1 may be less than 0.3, less than 0.2, less than 0.1, less than 0.05, less than 0.02, greater than 0.01, between 0.01 and 0.1, between 0.05 and 0.2, etc. The difference in refractive index between optical film 122-1 and optical film 122-2 may be less than 0.3, less than 0.2, less than 0.1, less than 0.05, less than 0.02, greater than 0.01, between 0.01 and 0.1, between 0.05 and 0.2, etc.

Using an adhesive layer (and optical films) with a high refractive index as shown in FIG. 17 therefore mitigates visible artifacts caused by reflections of ambient light. A diffractive layer of the type shown in FIG. 16 may be incorporated as one of optical films 122 if desired.

The foregoing is merely illustrative and various modifications can be made to the described embodiments. The foregoing embodiments may be implemented individually or in any combination.

What is claimed is:

1. An electronic device, comprising:
   a display configured to produce an image; and
   a display cover layer that overlaps the display, wherein the display cover layer comprises:
   an optical coupling layer configured to receive the image at an input surface and to transport the received image to an output surface;
   a protective layer that overlaps the output surface; and
   a diffractive layer between the optical coupling layer and the protective layer.

2. The electronic device defined in claim 1, wherein the optical coupling layer comprises polymer fibers and wherein the protective layer comprises a glass layer.

3. The electronic device defined in claim 1, further comprising:
   an adhesive layer that is interposed between the diffractive layer and the optical coupling layer.

4. The electronic device defined in claim 1, further comprising:
   an adhesive layer that is interposed between the diffractive layer and the protective layer.

5. The electronic device defined in claim 1, wherein the display comprises pixels configured to produce the image, wherein each pixel has a corresponding light-emitting area on the output surface of the optical coupling layer, wherein the diffractive layer is configured to generate duplicate light-emitting areas based on the light-emitting areas, and wherein each duplicate light-emitting area is interposed between two of the light-emitting areas.

6. The electronic device defined in claim 1, wherein the display comprises pixels configured to produce the image, wherein each pixel has a corresponding light-emitting area on the output surface of the optical coupling layer, and wherein the diffractive layer is configured to generate duplicate light-emitting areas to mitigate a screen-door effect.

7. The electronic device defined in claim 1, wherein the diffractive layer comprises a first layer having a first index of refraction and a second layer having a second index of refraction that is different than the first index of refraction, wherein the second layer conforms to the first layer, and wherein the first layer has a varying thickness.

8. The electronic device defined in claim 7, wherein the varying thickness of first layer comprises a first thickness in first portions of the first layer and a second thickness that is different than the first thickness in second portions of the first layer.

9. The electronic device defined in claim 7, wherein the varying thickness of the first layer has a first sinusoidal profile in a first direction and a second sinusoidal profile in a second direction that is orthogonal to the first direction.

10. The electronic device defined in claim 7, wherein the first layer has a plurality of diffractive elements that are separated by a pitch, wherein the diffractive elements have a first pitch in a first portion of the diffractive layer, and wherein the diffractive elements have a second pitch that is different than the first pitch in a second portion of the diffractive layer.

11. The electronic device defined in claim 7, wherein the second layer comprises an optically clear adhesive layer.

12. The electronic device defined in claim 1, wherein the optical coupling layer is separated from the diffractive layer by a distance and wherein the distance varies across the diffractive layer.

13. The electronic device defined in claim 1, wherein the diffractive layer has a plurality of diffractive elements that are separated by a pitch, wherein the diffractive elements have a first pitch in a first portion of the diffractive layer, and wherein the diffractive elements have a second pitch that is different than the first pitch in a second portion of the diffractive layer.

14. The electronic device defined in claim 13, wherein the first pitch is less than 50 micron.

15. An electronic device, comprising:
   a display configured to produce an image; and
   a display cover layer that overlaps the display, wherein the display cover layer comprises:
      an optical coupling layer configured to receive the image at an input surface and to transport the received image to an output surface; and
      a protective layer that overlaps the output surface of the optical coupling layer, wherein the protective layer has an inner surface with a plurality of recesses; and
      an additional layer between the optical coupling layer and the protective layer that fills the plurality of recesses, wherein the protective layer and the additional layer form diffractive elements.

16. The electronic device defined in claim 15, wherein the optical coupling layer comprises a coherent fiber bundle having polymer fibers.

17. The electronic device defined in claim 15, wherein the additional layer between the optical coupling layer and the protective layer comprises a layer of adhesive.

18. An electronic device, comprising:
   a display configured to produce an image; and
   a display cover layer that overlaps the display, wherein the display cover layer comprises:
      a coherent fiber bundle configured to receive the image at an input surface and to transport the received image to an output surface;
      a protective layer that overlaps the output surface;
      a diffractive layer between the coherent fiber bundle and the protective layer;
      a first optically clear adhesive layer that is interposed between the output surface and the diffractive layer; and
      a second optically clear adhesive layer that is interposed between the diffractive layer and the protective layer.

19. The electronic device defined in claim 18, wherein the first optically clear adhesive layer is in direct contact with the output surface and the diffractive layer and wherein the second optically clear adhesive layer is in direct contact with the diffractive layer and the protective layer.

20. The electronic device defined in claim 18, wherein the output surface has compound curvature in a rounded corner region and wherein at least some fibers in the coherent fiber bundle have a larger diameter at the output surface than at the input surface.

* * * * *